United States Patent [19]

Kashimura

[11] Patent Number: 5,696,555
[45] Date of Patent: Dec. 9, 1997

[54] IMAGE INPUT APPARATUS HAVING A DETACHABLY CONNECTED CAMERA BODY AND MONITOR OR CONTROL UNIT

[75] Inventor: Kazunori Kashimura, Tokyo, Japan

[73] Assignee: Canon Kabushiki Kaisha, Tokyo, Japan

[21] Appl. No.: 723,374

[22] Filed: Sep. 30, 1996

Related U.S. Application Data

[60] Continuation of Ser. No. 310,645, Sep. 22, 1994, abandoned, which is a division of Ser. No. 164,993, Dec. 10, 1993, Pat. No. 5,381,179, which is a continuation of Ser. No. 908,486, Jun. 30, 1992, abandoned, which is a continuation of Ser. No. 798,350, Nov. 21, 1991, abandoned, which is a continuation of Ser. No. 683,122, Apr. 9, 1991, abandoned, which is a continuation of Ser. No. 499,901, Mar. 27, 1990, abandoned.

[30] Foreign Application Priority Data

Mar. 30, 1989 [JP] Japan .................. HEI 01-080883

[51] Int. Cl.$^6$ ........................................... H04N 9/04
[52] U.S. Cl. ..................... 348/316; 348/211; 348/372; 348/333
[58] Field of Search ................. 348/376, 373, 348/372, 374, 375, 211, 207, 222, 333, 233, 341, 360; 358/906, 909; 354/219, 223, 228; H04N 9/04, 5/232, 5/225

[56] References Cited

U.S. PATENT DOCUMENTS

| | | | |
|---|---|---|---|
| 4,420,773 | 12/1983 | Toyoda et al. | 358/335 |
| 4,550,343 | 10/1985 | Nakatani | 358/229 |
| 4,625,243 | 11/1986 | Takubo | 358/229 |
| 4,682,240 | 7/1987 | Bachmann | 358/224 |
| 4,959,729 | 9/1990 | Fukuda et al. | 358/229 |
| 4,963,987 | 10/1990 | Ichiyoshi et al. | 358/229 |
| 4,965,462 | 10/1990 | Crawford | 358/909 |
| 5,119,203 | 6/1992 | Hosaka et al. | 358/229 |

FOREIGN PATENT DOCUMENTS

| | | | |
|---|---|---|---|
| 58-195370 | 11/1983 | Japan | H04N 5/26 |
| 59-158175 | 9/1984 | Japan | H04N 5/26 |
| 63-074044 | 4/1988 | Japan | G03B 19/02 |
| 63-077040 | 4/1988 | Japan | H04N 5/225 |
| 01121830 | 5/1989 | Japan | G03B 17/56 |

Primary Examiner—Glenton B. Burgess
Assistant Examiner—Nathan J. Flynn
Attorney, Agent, or Firm—Robin, Blecker, Daley and Driscoll

[57] ABSTRACT

A camera-integrated video recorder in which a camera portion and a recorder portion are disposed in a single casing is arranged in such a manner that a grip portion having a viewfinder and a control portion for controlling the recorder portion is rotatably and detachably fastened to the casing. The grip portion acts as a remote control device for remote-controlling the camera portion and the recorder portion when it has been detached from the casing. The casing has an image transmission circuit for transmitting monitor image information to the viewfinder in the grip portion.

12 Claims, 3 Drawing Sheets

5,696,555

IMAGE INPUT APPARATUS HAVING A DETACHABLY CONNECTED CAMERA BODY AND MONITOR OR CONTROL UNIT

This is a continuation application under 37 CFR 1.62 of prior application Ser. No. 08/310,645 filed Sep. 22, 1994 (abandoned), which is a division of Ser. No. 08/164,993, filed Dec 10, 1993 (U.S. Pat. No. 5,381,179), which is a continuation of Ser. No. 07/908,486, filed Jun. 30, 1992 (abandoned), which is a continuation of Ser. No. 07/798,350 filed Nov. 21, 1991 (abandoned), which is a continuation of Ser. No. 07/683,122, filed Apr. 9, 1991 (abandoned), which is a continuation of Ser. No. 07/499,901, filed Mar. 27, 1990 (abandoned).

BACKGROUND Of THE INVENTION

1. Field of the Invention

This invention relates to an image input appartus.

2. Description of the Related Art

In recent years, so-called camera-integrated video recorders, each of which is arranged in such a manner that an image sensing portion (a camera portion) and a recorder portion are positioned in a single casing, have been widely used because they can be easily handled and they have excellent mobility due to their compact size and light weight. In order to further facilitate handling, a structure has been disclosed in which a viewfinder portion is arranged to be movable. Furthermore, another structure has been disclosed in, for example, U.S. Pat. No. 4,494,147, U.S. patent application Ser. No. 266,950 filed on Nov. 3, 1988. According to the disclosure, an individual casing which accommodates a power source portion and a viewfinder portion and a casing (the body) which accommodates the camera portion and the recorder portion are coupled to each other in such a manner that they can rotate with respect to each other around a common axis and the angle made by the lens portion and the grip portion (the casing accommodating the power source portion and the view finderportion) can be optionally changed when the grip portion is rotated so that the attitude of the user can be freed.

Although handling can be facilitated by arranging the grip portion to be movable in the manner of the conventional camera-integrated video recorders, a further improvement has been desired because they cannot meet all of the conditions such as all of the photographing conditions, the posture of the user, the physique of the user and the like. In addition, since the grip portion is arranged to be movable, it is difficult to store depending upon the position of the grip portion. Furthermore, a problem in terms of the accommodation space remains unsolved.

SUMMARY OF THE INVENTION

An object of the present invention is to solve the above-stated problems.

Another object of the present invention is to provide a camera-integrated video recorder apparatus which can be easily handled and which exhibits an excellent mobility regardless of the camera angle.

In order to achieve the above-stated objects, according to the present invention, there is provided a camera-integrated video recorder in which a camera means and a recorder means are disposed in a single casing, the camera-integrated video recorder being arranged in such a manner that its grip portion having a viewfinder is rotatably and detachably fastened to the casing.

A further object of the present invention is to provide a camera or a camera-integrated video recorder arranged in such a manner that a detachably provided grip serves as a remote controller and the sensed image can be monitored on a viewfinder disposed in the grip portion.

A still further object of the present invention is to provide a camera-integrated video recorder whose grip, which is capable of varying the grip accommodating ways, selecting the state of the grip to meet the conditions of use and the desires from the user, facilitating handling, improving mobility and having a control portion, can be detached, the grip thus detached serving as a remote controller capable of remote-controlling the camera-integrated video recorder, causing handling to be facilitated and the accommodating space to be effectively saved.

An additional object of the present invention is to provide a system arranged in such a manner that a grip means having a viewfinder and a camera and recorder means are arranged to be rotatable and detachable from each other so that the state of the grip means is selected to meet the conditions of the use and the desire from the user, while handling can be facilitated and mobility can be improved. Furthermore, since the grip means can serve, after detachment, as a remote controller for remote-controlling the camera and recorder means, the system can be used in further various conditions and with which the accommodation space can be saved and it can be carried readily.

In order to achieve the above-described objects, according to the present invention, there is provided a camera-integrated video recorder arranged in such a manner that a camera means thereof and a recorder means thereof are disposed in a single casing and a grip means having an image monitor means and a control portion for controlling the camera means and the recorder means is detachably fastened thereto, the camera-integrated video recorder comprising: operation information transmission means disposed in the grip means and capable of remote-controlling the camera means and the recorder means by transmitting operation information of the control portion when the grip means has been detached from the casing; and image transmission means disposed in the casing and capable of transmitting image information to the image monitor means of the grip means when the grip means has been detached from the casing.

In further accordance with the invention, there is provided an image input apparatus in which a body is provided with a camera unit having a first power source for driving the camera unit and in which a monitor is also provided, with the body being detachably connected to the monitor, and a control means is further provided for making to supply the body and the monitor with power by only the second power source for driving the camera unit and monitor when the monitor has been connected to the body.

Also, in accordance with the invention, there is provided an image input apparatus including: a body having a camera means and first power source for driving the camera means; a control unit detachably connected to the body and having a control means and second power source for driving the control means, the control means being capable of remotely controlling the camera means when the control unit is detached from the body; and a selecting means for making to supply the body and control unit with power by only the second power source for driving the camera means and control means when the control unit is connected to the body.

Other and further objects, features and advantages of the invention will appear more fully from the following description.

DETAILED DESCRIPTION OF THE PREFERRED EMBODIMENTS

Preferred embodiments of a camera-integrated video recorder according to the present invention will now be described with reference to the drawings.

Figure 1:
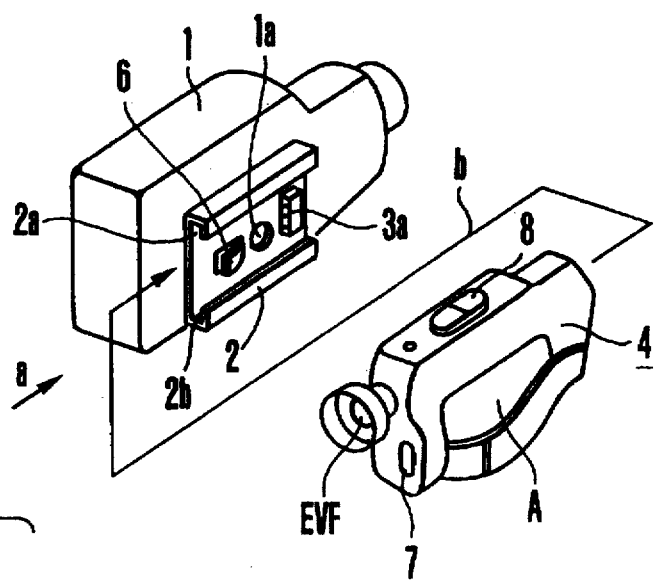
FIG. 1 is a perspective view which illustrates the structure of a camera-integrated video camera recorder according to the present invention.
Figure 2:
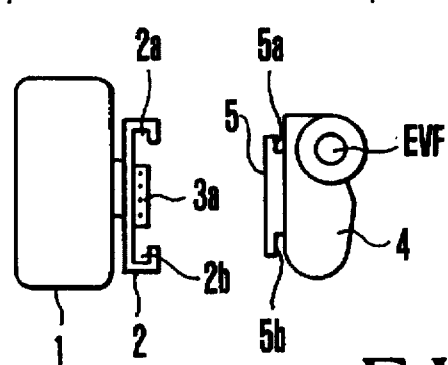
FIG. 2 is a rear view when viewed in the direction of an arrow "a" in FIG. 1.
Figure 3:
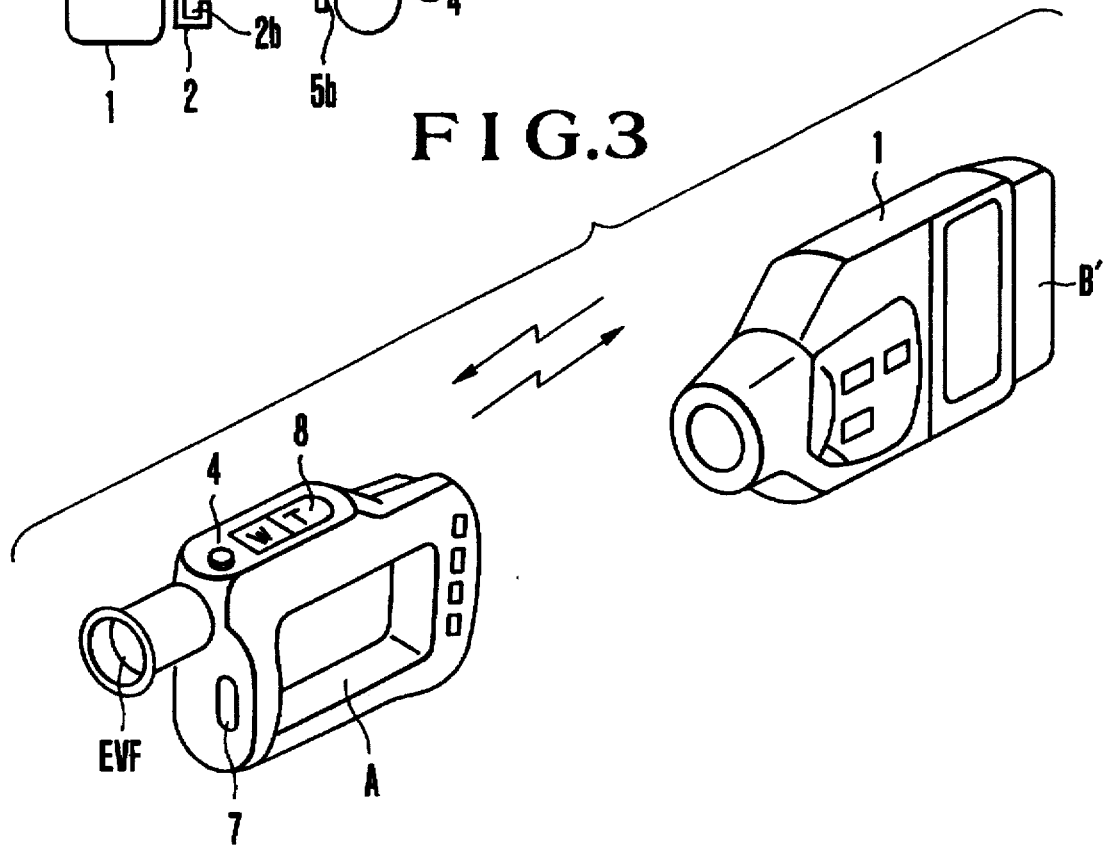
FIG. 3 is a perspective view which illustrates the camera-integrated video recorder according to the present invention when viewed in another direction in FIG. 1.

FIG. 1 is a perspective view which illustrates the camera-integrated video recorder according to the present invention and also illustrates a state in which a camera and recorder portion and a grip portion have been detached from each other when viewed from the rear side. FIG. 2 is a rear view of the state shown in FIG. 1 when viewed in the direction of the arrow "a" in FIG. 1. FIG. 3 is a perspective view which illustrates another usage state of the camera-integrated video recorder in which the camera and recorder portion and the grip portion have been detached from each other.

Referring to the figures, reference numeral 1 represents a casing (to be called "a camera body" hereinafter) having a camera portion and a recorder portion. Reference numeral 2 represents an attachment base which is rotatably fastened to the camera body 1 by means of a rotary shaft 1a and to which a grip portion, to be described later, can be fastened. The attachment base 2 can be formed by bending its two sides in substantially U-shape facing side, the attachment base 2 having fastening grooves 2a and 2b arranged to be engaged to the grip portion to be described later so as to hold it. Reference numeral 3a represents a connector having a plurality of electric contacts through which signals pass between the camera body 1 and the grip portion, the electric contacts acting to supply power or the like when the grip to be described later is fastened. Reference numeral 4 represents a grip portion having an electronic viewfinder EVF, a zoom operating switch 8 and switches such as a recording trigger switch 7 for starting the recording operation. As is shown form FIG. 3, the grip portion 4 has a portion A for accommodating a power source battery therein so that the power source battery is accommodated in the grip portion 4. The grip portion 4 has, on its surface which is fastened to the camera body 1, a grip-side attachment 5 fixed thereto and having fastening projections 5a and 5b arranged to be engaged to the fastening grooves 2a and 2b formed in the attachment base 2 of the camera body 1. As designated by an arrow "b" shown in FIG. 1, the grip portion 4 can be fastened to the camera body 1 in such a manner that the attachment of the grip portion 4 is moved from the rear portion of the camera body 1 along the fastening grooves 2a and 2b so as to be engaged to the attachment base 2. The fastening of the camera body 1 and the grip portion 4 also establishes an electric connection between the circuit connector 3a provided for the camera body 1 and a circuit connector 3b, to be described later, provided for the grip 4.

After the fastening of the camera body 1 and the grip portion 4 has been completed, the fastening state is locked by a locking mechanism 6. Thus, the grip portion 4 is rotatably fastened to the camera body 1, centering the rotary shaft 1a so that the most suitable camera angle can be made so as to correspond to a variety of photographing conditions.

Since circuits are established between the grip portion 4 and the camera body 1 by the circuit connectors 3a and 3b, the range of the angles in which the grip portion 4 can rotate with respect to the camera body 1 has been previously restricted by a stopper (omitted from illustration) to a predetermined angle.

Then, the circuit formed in the camera-integrated video recorder will be described with reference to FIG. 4.

Figure 4:
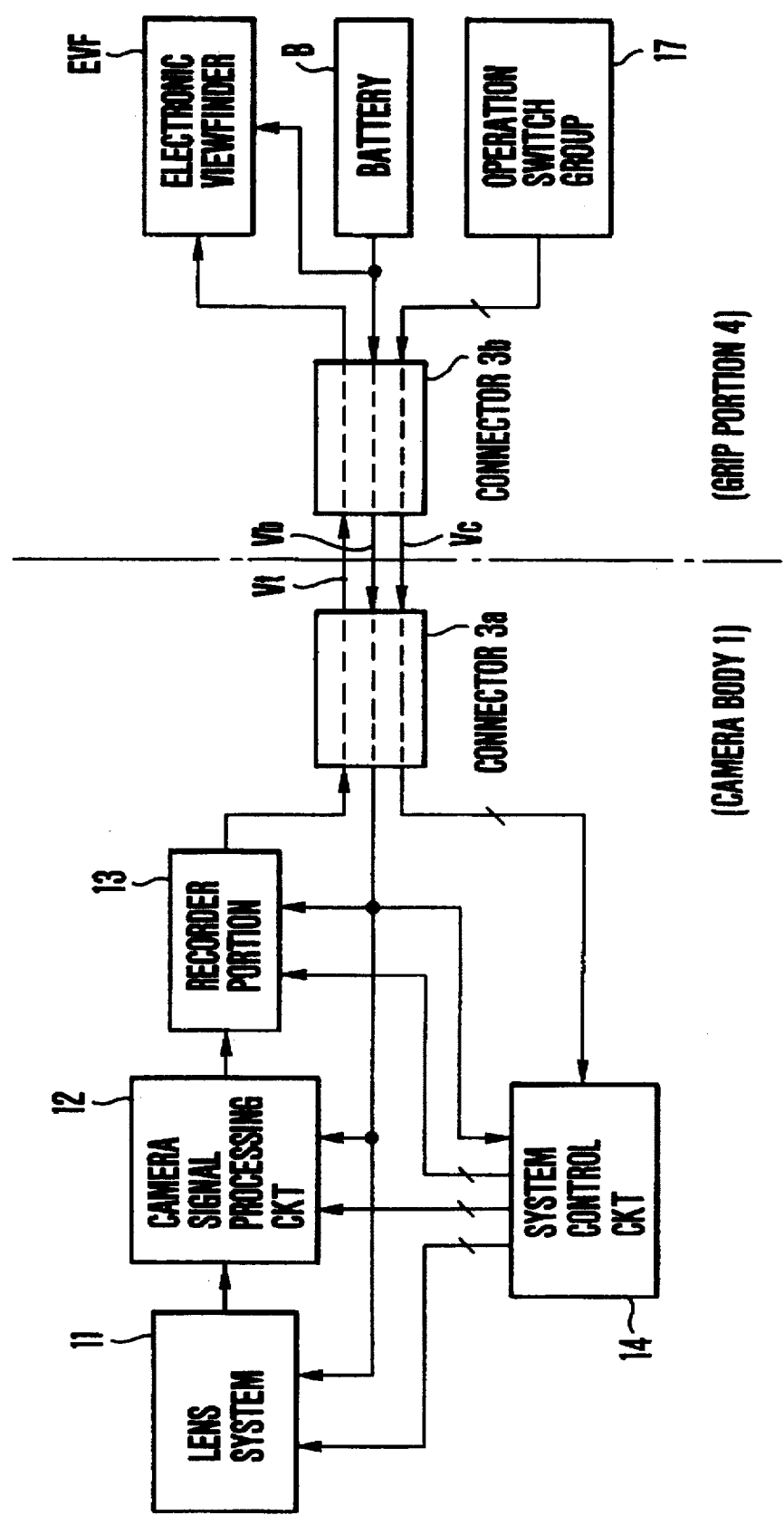
FIG. 4 is a block diagram which illustrates the circuit for use in the camera-integrated video recorder according to the present invention.

Referring to FIG. 4, light which has made incident through a photographing lens system 11 provided in the camera body 1 is photo-electrically converted by a camera-signal processing circuit 12, and is processed in a predetermined way so as to be converted into a TV signal. Then, the TV signal is supplied to a recorder portion 13. In the recorder portion 13, recording on a recording medium such as a magnetic tape is, if necessary, conducted in accordance with an operation of a user. All of the above-stated circuits are collectively controlled by a system control circuit 14.

During the recording operation, the above-stated TV signal is supplied to the connector 3a via the recorder portion 13 so that it is then transmitted to the grip-side connector 3b which is mechanically and electrically connected to the connector 3a, the TV signal being transmitted via a video signal line Vt. The TV signal is supplied to the electronic viewfinder EVF disposed in the grip portion 4 so that a picture which is being taken can be monitored.

The user can control the recording action by operating various switches such as the zoom operating switch 8, the recording trigger switch 7 or the like while monitoring the picture displayed on the electronic viewfinder EVF. The control signals for conducting the above-stated controls are transmitted through a control signal line Vc.

The state of the operation of an operation switch group 17 such as the zoom operating switch 8, the recording trigger switch 7, and the other switches disposed in the grip portion 4 is also supplied to the system control circuit 14 in the camera body 1 via the connectors 3a and 3b. As a result, the mode of the lens system 11, the camera signal processing circuit 12 and the recorder portion 13 are controlled in accordance with the state of the operation of the operation switch group 17. The camera body 1 is supplied with power from the power source battery B accommodated in the grip portion 4 via a power supply line Vb formed by the connectors 3a and 3b, while the grip-side circuit is directly supplied with power from the grip-side battery B.

Another structure may be employed in which an output from the power source battery B is first supplied to a power supply voltage stabilizing circuit (omitted from illustration) provided for the camera body 1 via the connectors 3a and 3b so as to be a constant voltage, the output being then again transmitted through the connectors 3a and 3b so as to be supplied to each of the circuits in the grip portion 4.

Figure 5:
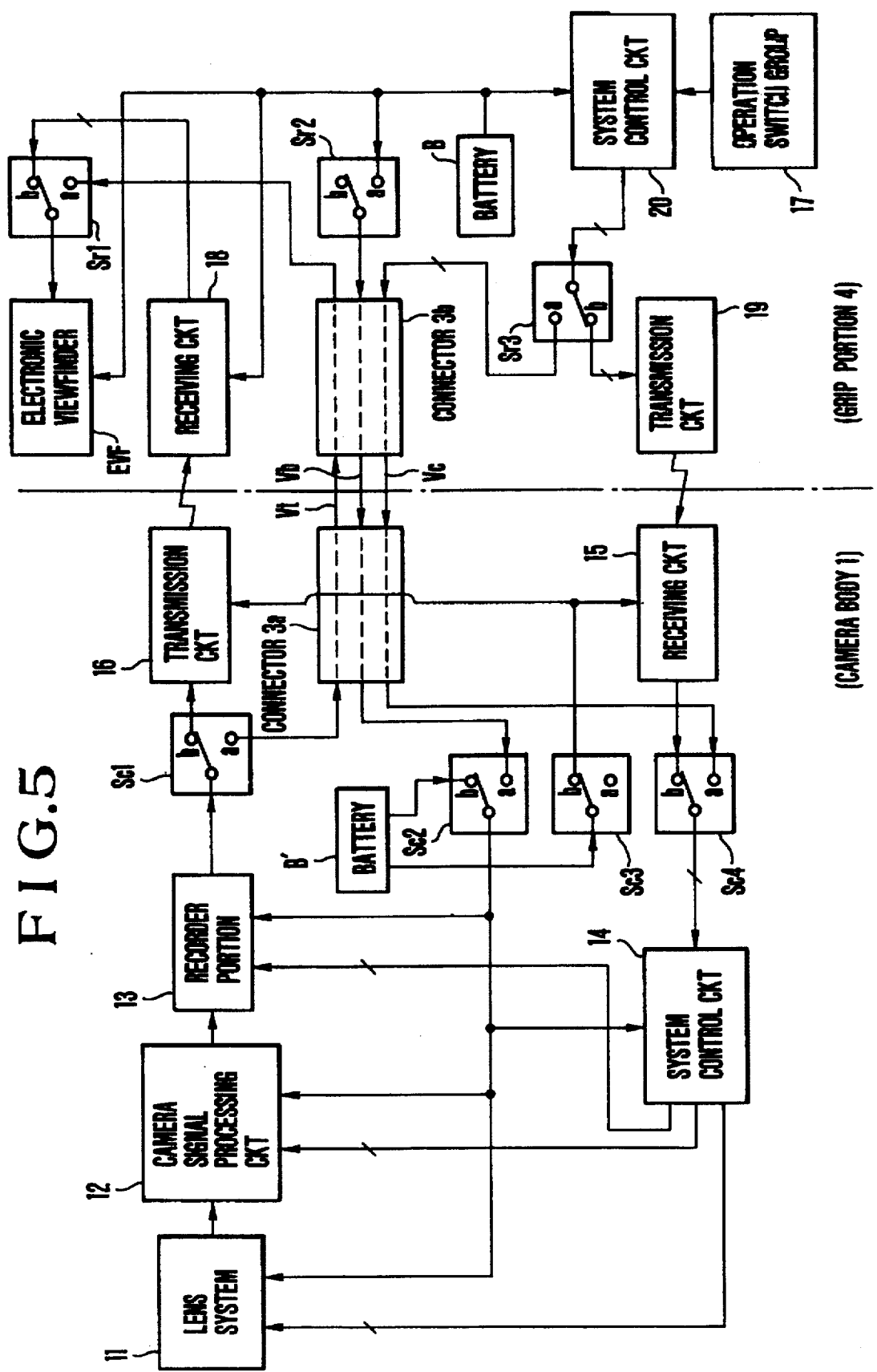
FIG. 5 is block diagram which illustrates the circuit for use in the camera-integrated video recorder according to another embodiment of the present invention.

FIG. 5 is a block diagram which illustrates a second embodiment of the circuit according to the present invention. This embodiment is characterized in that the camera body 1 can be remote-controlled in such a manner that the grip portion 4 is arranged to act as a remote controller after it has been detached from the camera body 1. According to this embodiment, the same elements as those according to the first embodiment shown in FIG. 4 are given the same reference numerals and their descriptions are omitted here.

A power source battery B' is provided for the camera body 1 in order to supply power to each of the circuits in the camera body 1. Furthermore, a control-signal receiving circuit 15 is also provided for the purpose of receiving an operation command signal from the remote controller which is the grip portion 4 detached from the camera body 1. The command signal from the remote controller is received by the receiving circuit 15 in which it is demodulated and decoded so as to be supplied to the system control circuit 14o As a result, the circuits in the camera body 1 are operated.

In order to display an image which is being photographed by the camera body 1 or a reproduced image signal on the electronic viewfinder EVF of the grip portion 4 when the grip portion 4 has been detached, a video signal transmission circuit 16 for supplying a signal in the recorder portion 13 to the grip portion 4 is provided.

The above-stated circuits are switched by means of switched Sc1, Sc2, Sc3 and Sc4 which can be automatically switched in accordance with the connection/disconnection of the connectors 3a and 3b. These switches are switched to a contact "a" when the grip portion 4 is coupled to the camera body 1 and the connectors 3a and 3b are thereby connected to each other. As a result, power supply to the circuits from the camera-side battery B' is terminated but power from the grip-side battery B supplied via the power supply line Vb formed by the connectors 3a and 3b is supplied to the circuits in the camera body 1.

When the grip portion 4 is detached, the switches Sc1, Sc2, Sc3 and Sc4 are switched to a contact "b" so that all of the circuits in the camera body 1 are operated by the built-in battery B'. Also, the transmission circuit 16 and the receiving circuit 15 are supplied with power and thereby actuated.

On the other hand, the grip portion 4 is provided with a receiving circuit 18 for receiving a video signal transmitted from the camera-side transmission circuit 16 and supplying it to the electronic viewfinder EVF when the grip portion 4 is detached, the grip portion 4 being further provided with a transmission circuit 19 for supplying an operation command signal generated by the operation switch group 17 in the grip portion 4 to the camera body 1.

Furthermore, switches Sr1, Sr2 and Sr3 arranged to be switched in accordance with the connection/disconnection of the connectors 3a and 3b are provided for the grip potion 4. These switches are switched to the contact "a" when the grip portion 4 is coupled to the camera body 1 so that power supply to the transmission circuit 19 and the receiving circuit 18 in the grip portion 4 is terminated, but power from the battery power source B disposed in the grip portion 4 is supplied to the camera body 1 via the connectors 3a and 3b. A mode instruction signal corresponding to the operation of each of the switches of the operation switch group 17 is converted by the grip-side system control circuit 20 into a control signal which corresponds to the operation of each of the switches, the control signal being then supplied to the camera-side system control circuit 14 via the connectors 3a and 3b.

When the grip portion 4 has been detached from the camera body 1, the switches Sr1, Sr2 and Sr3 are switched to the contact "b" so that power is supplied to the receiving circuit 18 and the transmission circuit 19, causing these circuits to be actuated. Furthermore, the power supply via the connectors 3a and 3b is terminated. The mode instruction signal corresponding to the operation of the switches of the operation switch group 17 is converted by the grip-side system controller 20 into a control signal which corresponds to the operation of each of the switches, the control signal being then supplied to the transmission circuit 19 so that the instruction signal can be transmitted to the camera body 1.

As described above and according to this embodiment of the apparatus, the battery B' in the camera body 1 is disconnected from the transmission circuit 16 and the receiving circuit 15 so that these circuits are turned off when the grip portion 4 is coupled to the camera body 1. On the other hand, both the transmission circuit 19 and the receiving circuit 18 in the grip portion 4 are disconnected from the battery B so that these circuits are turned off, power of the battery B being supplied to the camera body 1 via the power supply line Vb established by the connectors 3a and 3b. Also the operation instruction signal and the image signal to be monitored are transmitted through the control signal line Vc and the video signal line Vt established by the connectors 3a and 3b. Therefore, the same operating state as that according to the embodiment shown in FIG. 4 can be realized.

When the grip portion 4 has been detached from the camera body 1, the connectors 3a and 3b are separated from each other, causing the electrical connection established between the camera body 1 and the grip portion 4 to be disconnected. Therefore, the switches Sc1, Sc2, Sc3 and Sc4 of the camera body 1 are switched to the contact "b", while the switches Sr1, Sr2 and Sr3 of the grip portion 4 are switched to the contact "b".

As a result, power is supplied from the battery B' included in the camera body 1 to the components of the camera body 1 such as the lens system 11, the camera signal processing circuit 12, the recorder portion 13, the transmission circuit 16 and the receiving circuit 15. Furthermore, the control instruction input terminal of the system control circuit 14 is switched from the connector to the receiving circuit 15 so that it receives the control instruction signal transmitted from the grip portion 4. As a result, the circuits are controlled in accordance with the contents of the control instruction signal.

Each of the circuits in the grip portion 4 is supplied with power from the remote controller-side power source battery B so that the included receiving circuit 18 and the transmission circuit 19 are actuated. The operation instruction signal transmitted from the system control circuit 20 is transmitted to the camera body 1 via the transmission circuit 19. That is, the action of the camera body 1 can be remote-controlled by operating the operation switch group 17 provided for the grip portion 4. Furthermore, the video signal transmitted from the camera-side transmission circuit 19 is received by the receiving circuit 18 so as to be displayed on the electronic viewfinder EVF.

As described above, since the grip portion 4 can be used as the remote controller capable of controlling the action of the camera body 1 when the grip portion 4 has been detached from the camera body 1, the shouting can be freely conducted. Furthermore, when it is not used as the remote controller, it serves as the grip. Therefore, an independent space for the accommodation of the grip is not necessary, and losing or forgetting of the grip can be prevented.

As the transmission means is necessary when grip is being served as the remote controller according to the above described embodiments, radio waves, infrared rays or the like can be employed. Furthermore, analog-modulated infrared rays or digital-modulated infrared rays which are employed as usual remote controllers can be employed. Since these communication means can utilize the conventional means, its description is omitted here.

As described above, according to the camera-integrated video recorder apparatus, the camera body is arranged in such a manner that the grip portion having the viewfinder and the camera and the recorder portions are rotatable with respect to each other and detachable. Therefore, the grip can be selected to correspond to the conditions of use and to meet the desires from the user. As a result, handling can be facilitated and the mobility can be improved.

Furthermore, since the grip portion can serve, when it is detached from the camera body, as the remote controller for remote-controlling the camera and the recorder portion, it can be used further widely.

In addition, a system overcoming a problem in terms of an accommodation space can be easily realized.

Although the invention has been described in its preferred form with a certain degree, it is understood that the present disclosure of the preferred form has been changed in the details of construction, and the combination and arrangement of parts may be resorted to without departing from the spirit and the scope of the invention as hereinafter claimed.

What is claimed is:

1. An image input apparatus, comprising:
   (a) a body having a camera unit and a first power source for driving said camera unit;
   (b) a monitor having a second power source for driving said monitor, said body detachably connected to said monitor; and
   (c) control means for making to supply said body and said monitor with power by only said second power source for driving said camera unit and said monitor in the state that said monitor has been connected to said body.

2. An image input apparatus, comprising:
   (a) a body having camera means and a first power source for driving said camera means;
   (b) a control unit detachably connected to said body and having control means and a second power source for driving said control means, said control means being capable of effecting remote control of said camera means in the state that said control unit has been detached from said body; and
   (c) selecting means for making to supply said body and said control unit with power by only said second power source for driving said camera means and said control means in the state that said control unit has been connected to said body.

3. An apparatus according to claim 2, wherein said monitor part has remote control means being capable of effecting remote control of said camera part in the state that said camera part has been detached from said monitor part.

4. An apparatus according to claim 1, further comprising a first connector and a second connector physically connected or transmitting a signal issued from said camera unit under the condition that said monitor is connected to said body, said first connector being provided on said body and the second connector being provided on said monitor.

5. An apparatus according to claim 1, wherein said body has a transmission part for transmitting by wireless a signal issued from said camera unit, and said monitor has a receiving part for receiving the signal issued from said transmission part.

6. An apparatus according to claim 4, wherein said body has a transmission part for transmitting by wireless a signal issued from said camera unit, and said monitor has a receiving part for receiving the signal issued from said transmission part.

7. An apparatus according to claim 5, wherein said monitor has a display and prohibits the transmission of the signal from said receiving part to said display when said monitor is connected to said body.

8. An apparatus according to claim 2, further comprising a first connector and a second connector physically connected or transmitting a signal issued from said camera means under the condition that said control unit is connected to said body, said first connector being provided on said body and the second connector being provided on said control unit.

9. An apparatus according to claim 2, wherein said body has a transmission part for transmitting by wireless a signal issued from said camera means, and said control unit has a receiving part for receiving the signal issued from said transmission part.

10. An apparatus according to claim 8, wherein said body has a transmission part for transmitting by wireless a signal issued from said camera means, and said control unit has a receiving part for received the signal issued from said transmission part.

11. An apparatus according to claim 9, wherein said control unit has a display and prohibits the transmission of the signal from said receiving part to said display when said control unit is connected to said body.

12. An apparatus according to claim 1, wherein said camera unit including a recorder.

* * * * *

UNITED STATES PATENT AND TRADEMARK OFFICE
CERTIFICATE OF CORRECTION

PATENT NO. : 5,696,555
DATED      : December 9, 1997
INVENTOR(S): Kashimura

It is certified that error appears in the above-identified patent and that said Letters Patent is hereby corrected as shown below:

Col. 5, line 10, delete "14o" and insert -- 14. --.

Signed and Sealed this

Twenty-eighth Day of April, 1998

Attest:

Attesting Officer

BRUCE LEHMAN
*Commissioner of Patents and Trademarks*